Figure 1:
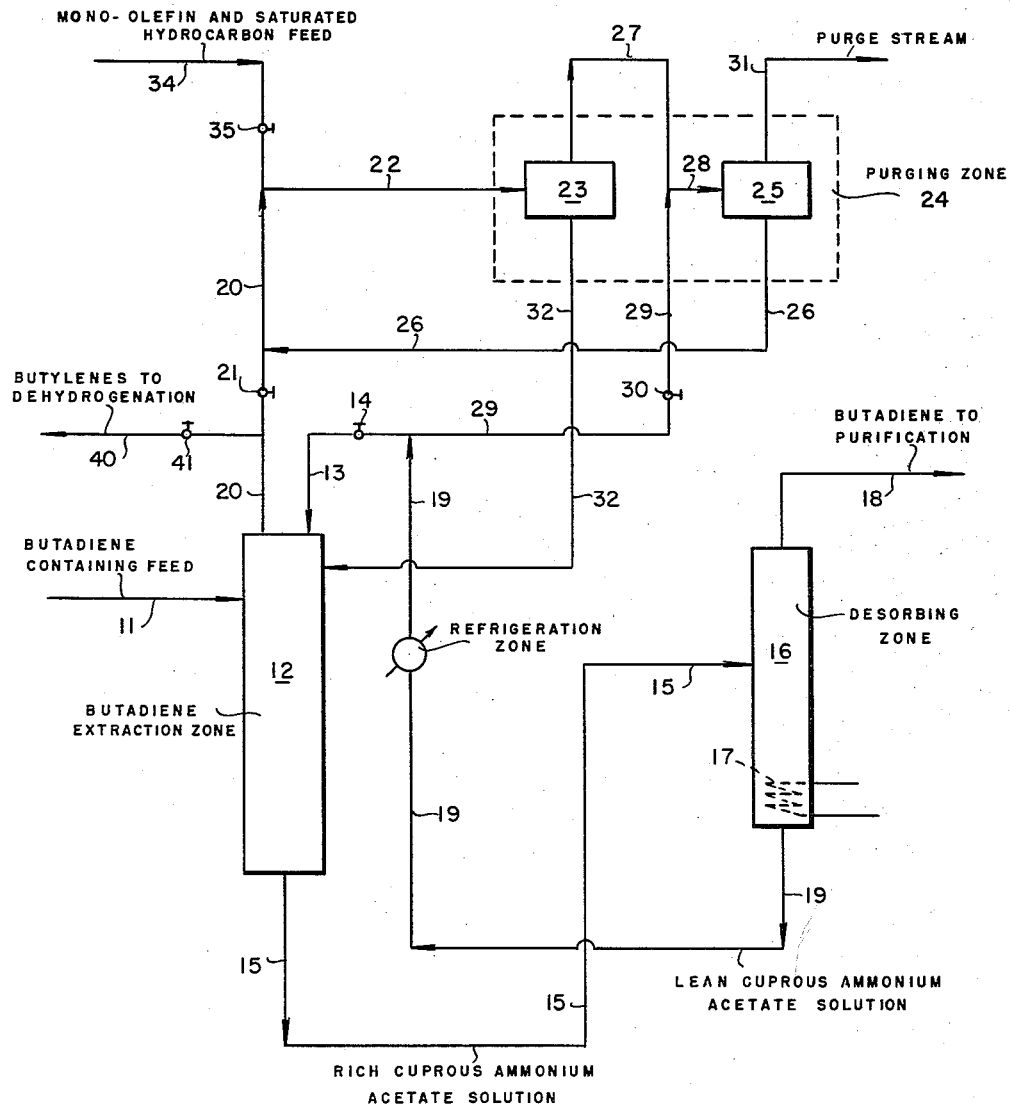

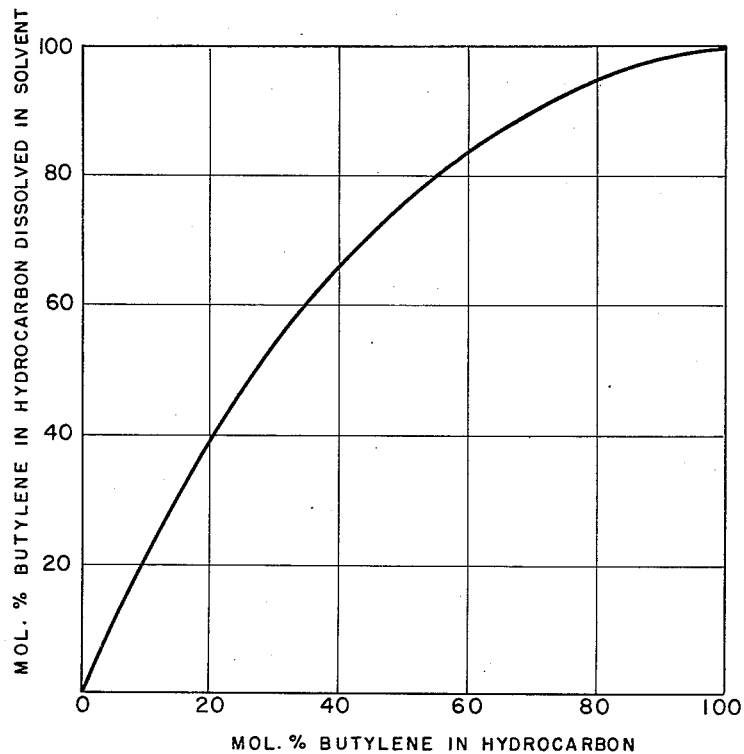

United States Patent Office 3,105,100
Patented Sept. 24, 1963

3,105,100
SEPARATION OF MONOOLEFINS FROM SATURATED HYDROCARBONS
Charles F. Van Berg, Lima, Peru, and John R. Hodson, Stamford, Conn., assignors, by mesne assignments, to Esso Research and Engineering Company, Elizabeth, N.J., a corporation of Delaware
Filed Nov. 24, 1959, Ser. No. 855,082
1 Claim. (Cl. 260—677)

The present invention is directed to the separation of monoolefins from saturated hydrocarbons. More particularly, the invention is concerned with separation of butylenes from butanes. In its more specific aspects, the invention is concerned with preventing the buildup of saturated hydrocarbons in the solvent extraction of monoolefins.

The present invention may be briefly described as a method for separating monoolefins from saturated hydrocarbons which comprises contacting a substantially diolefin-free hydrocarbon containing monoolefins and saturated hydrocarbons having the same number of carbon atoms with a lean aqueous solution of cuprous ammonium acetate under conditions to form a raffinate phase of increased saturated hydrocarbon content and a solvent extract phase. The raffinate phase is discarded and monoolefins are recovered from the extract phase. The term "lean aqueous solution of cuprous ammonium acetate" as used in the specification and claim is intended to define regenerated cuprous ammonium acetate which has been separated from butadiene in a steam heated desorbing zone.

The invention also briefly involves preventing buildup of saturated hydrocarbons in the solvent extraction of diolefins in which a hydrocarbon feed containing diolefins, monoolefins, and saturated hydrocarbons having the same number of carbon atoms are extracted with lean aqueous solution of cuprous ammonium acetate under conditions to form a first substantially diolefin-free raffinate phase of predominantly monoolefin and saturated hydrocarbons and a first solvent extract phase from which butadiene is recovered. At least a portion of the first raffinate phase is contacted with an aqueous solution of cuprous ammonium acetate under conditions to form a second raffinate phase of increased saturated hydrocarbon content and a second solvent extract phase. The second raffinate phase is further extracted while the second extract phase is returned to the diolefin extraction zone for contact with the lean aqueous solution contacting the hydrocarbon feed, as will be more clearly set forth hereinafter.

In the preparation of butadiene, it is necessary to concentrate butadiene from a dilute solution of butadiene and butylenes in which some butane and other impurities may be present. The material remaining after removing the major amount of the butadiene consists of butylenes which may be dehydrogenated to butadiene. For satisfactory dehydrogenation operations, it is desirable that material other than normal butylene be maintained at a low concentration. Because material other than normal butylene is less active than normal butylene in the dehydrogenation reaction and because this material other than normal butylene is continuously introduced into the dehydrogenation reaction along with makeup normal butylene, it becomes necessary in in such operations to purge a stream from the extraction cycle to control the concentration of material other than normal butylene to levels which may be tolerated in the dehydrogenation zone. Ordinarily the purged stream is of the same composition as the recycle stream of butylenes to the dehydrogenation reaction which removes valuable normal butylene and thus reduces potential butadiene production. In accordance with the present invention, aqueous cuprous ammonium acetate solution is employed to separate butylenes from butane in the substantial absence of butadiene, which results in the saturated hydrocarbons being removed from the recycle stream while diminishing the loss of butylenes from the system. The present invention is therefore quite advantageous and useful.

The present invention will be further illustrated by reference to the drawing in which:
FIG. 1 is a flow diagram of a preferred mode; and
FIG. 2 is a graph of data showing the relationship between the butylenes in hydrocarbons dissolved in solvent with respect to butylenes in the hydrocarbon phase at equilibrium.

Referring now to the drawing, numeral 11 designates a line through which a cooled feed stream containing butadiene and also containing butylenes and butanes which is introduced into a butadiene extraction zone 12, which may be a system such as illustrated in the Packie et al. Patent 2,420,906. Conditions are adjusted in butadiene extraction zone 12 to produce an extract phase and a raffinate phase, as a result of extraction under suitable conditions with cuprous ammonium acetate solution introduced into zone 12 by line 13 controlled by valve 14 from a source which will be described further. The extract phase from zone 12 is withdrawn by line 15 and introduced into a desorbing zone 16 provided with a heating means illustrated by steam coil 17 by way of which temperature and pressure are adjusted to allow separation of butadiene from the solvent extract by way of line 18 for further purification such as by water washing, distillation, and the like such as described in the patent to Packie et al. supra. The lean cuprous ammonium acetate solution is withdrawn from zone 16 by line 19 which connects to line 13 for introduction into zone 12, as has been described.

The raffinate phase from zone 12 is withdrawn by line 20 controlled by valve 21 and introduced, at least in part, by branch line 22 into a first stage 23 of a purging zone, generally designated by the numeral 24. Purging zone 24 is comprised of stages 23 and 25. The raffinate phase introduced by lines 20 and 22 into stage 23, has admixed therewith in line 20 aqueous solution of cuprous ammonium acetate withdrawn by line 26 from stage 25. The hydrocarbon phase from stage 23 flows by way of line 27 and branch line 28 into stage 25, the hydrocarbon phase being contacted with aqueous cuprous ammonium acetate solution introduced into line 28 by branch line 29 controlled by valve 30 which connects with line 19. As a result of adjustment of conditions in stage 25, a second raffinate phase, which is rich in butanes, is withdrawn as a purge stream from stage 25 by line 31 while the extract phase from stage 25 is introduced by line 26 into line 20. The extract phase from stage 23 is withdrawn by line 32 and introduced into extraction zone 12.

In the practice of the present invention, it is contemplated that an enriched butylene stream may be withdrawn from line 20 by line 40 controlled by valve 41, another portion of the raffinate flowing by line 20, as has been described, to stage 23. It is also contemplated that monoolefin and saturated hydrocarbon feed from another source may be introduced into stage 23 and finally into stage 25 by way of line 34 controlled by line 35. The stream introduced by line 34 may also be cooled. For example, the streams in lines 11 and 34 may be cooled separately by heat exchange with cold streams leaving the system.

The present invention is quite important and useful in that by a system as described with respect to FIG. 1, in excess of 50% of the butylenes usually lost with the purge stream may be recovered by extraction with cold cuprous ammonium acetate solution. Thus, the cuprous ammonium acetate solution from the purging zone of the present invention contains recovered butylenes, and when introduced into the butadiene extraction zone, gives up its butylene content to the raffinate stream, resulting in an increased recovery of butylenes which may be dehydrogenated to butadiene.

In practicing the present invention, temperatures in butadiene extraction zone may range from about 0° F. to about 120° F. while pressures may vary from about 25 to about 100 pounds per square inch gauge.

Temperatures in the purging zone 24 and particularly stages 23 and 25 may range from about 0° to about 60° F. while pressures may range from about 25 to about 100 pounds per square inch gauge.

The aqueous solution of cuprous ammonium acetate may be a cuprous salt solution of three gram moles per liter of cuprous ion, four gram moles per liter of acetate, and eleven gram moles per liter of total ammonium. Other solutions of cuprous salts may be used, such as cuprous salt solutions of a sulfate, phosphate, lactate, tartrate, formate, borate, carbonate, chloride, fluoride, glycolate, thioglycolate, benzoate, salicylate, benzene sulfonate, orthophosphate, cyanide, thiocyanate, maleate, and the like. These latter cuprous salts may be used with amine derivatives such as methyl amines, ethyl amines, ethanolamine, ammonium chloride, and the various acids and the like.

The hydrocarbons which may be the feed stock to the present invention may include hydrocarbon feeds containing diolefins, monoolefins, and saturated hydrocarbons having 4 to 7 carbon atoms to the molecule. By way of example only, a hydrocarbon feed such as a $C_4$ fraction containing butadiene, butylenes, and butanes may be used as the preferred feed stock. $C_5$, $C_6$, and $C_7$ fractions may also be used. The hydrocarbon fractions forming the feed stock of the present invention may be obtained from refinery sources such as cracking operations, polymerization operations, dehydrogenation, and any source which forms substantial quantities of diolefins and monoolefins in admixture with saturated hydrocarbons.

The butadiene-containing feed and solvent may be introduced into the system in an amount sufficient to provide a solvent to feed ratio of about four but which may range from about 2 to about 8 volumes of cuprous ammonium acetate solution per volume of feed. The butylenes withdrawn by line 32 may comprise about 10 volumes while about 1 to about 2 volumes of butylenes may be introduced into purging zone 24. The lean cuprous ammonium acetate solution may comprise from about 100 to 500 volumes while the butadiene production may range from about 3 to about 5 volumes.

As an example of the present invention, the butylenes withdrawn by line 32 may contain about 90% butylenes while the butylenes purged by line 31 will contain only about 75% to about 80% butylenes, with the remainder being saturated hydrocarbons and thus resulting in a substantial saving in butylenes.

To illustrate further the practice of the present invention, reference to FIG. 2 will show that the butylenes in hydrocarbon dissolved in the solvent may be about 80 mole percent while the butylenes in the hydrocarbon phase at equilibrium will only be about 47.5 mole percent, showing the effectiveness of the present invention in purging saturated hydrocarbons from the system and preventing buildup of saturated hydrocarbons which ordinarily results in the displacement of substantial amount of butylenes, which reduces the amount of butadiene produced in the dehydrogenation of butylenes. The present invention is quite desirable, advantageous, and useful.

The nature and objects of the present invention having been completely described and illustrated, what we wish to claim as new and useful and secure by Letters Patent is:

A method for preventing build-up of saturated hydrocarbons in the solvent extraction of butadiene which comprises contacting a dehydrogenation product containing butadiene, butane, butene-1 and butene-2 with lean cuprous ammonium acetate in a butadiene extraction zone under conditions such that a substantially butadiene-free raffinate is produced and a butadiene-rich extract phase is produced, recovering butadiene from said extract phase, recycling a portion of said raffinate phase to the butadiene dehydrogenation zone, introducing a portion of said raffinate phase to a purging zone which comprises first and second contacting stages, contacting said butadiene raffinate in said first stage with the extract from said second stage under conditions to produce a butane-rich first stage raffinate and a substantially butane-free stage extract, recycling said first stage extract to said butadiene extraction zone, passing said first stage raffinate into said second stage, contacting said raffinate in said second stage with lean cuprous ammonium acetate under conditions to form a substantially butane-rich second stage raffinate phase, and a substantially butane-free second stage extract phase, recycling said second stage extract phase into said first stage of the purging zone, and removing said butane-rich second stage raffinate from said system.

References Cited in the file of this patent
UNITED STATES PATENTS

| | | |
|---|---|---|
| 2,386,310 | Hachmuth | Oct. 9, 1945 |
| 2,420,906 | Packie et al. | May 20, 1947 |
| 2,494,546 | Fasce | Jan. 17, 1950 |
| 2,557,923 | Ray et al. | June 26, 1951 |
| 2,589,960 | Ray | Mar. 18, 1952 |
| 2,887,521 | Alexander et al. | May 19, 1959 |
| 2,921,053 | Dye | Jan. 12, 1960 |